May 26, 1970  A. T. IRELAND  3,514,619
OPTICAL-MECHANICAL SCANNING APPARATUS UTILIZING OPPOSITELY
OSCILLATING OPTICAL WEDGES
Filed Nov. 30, 1967
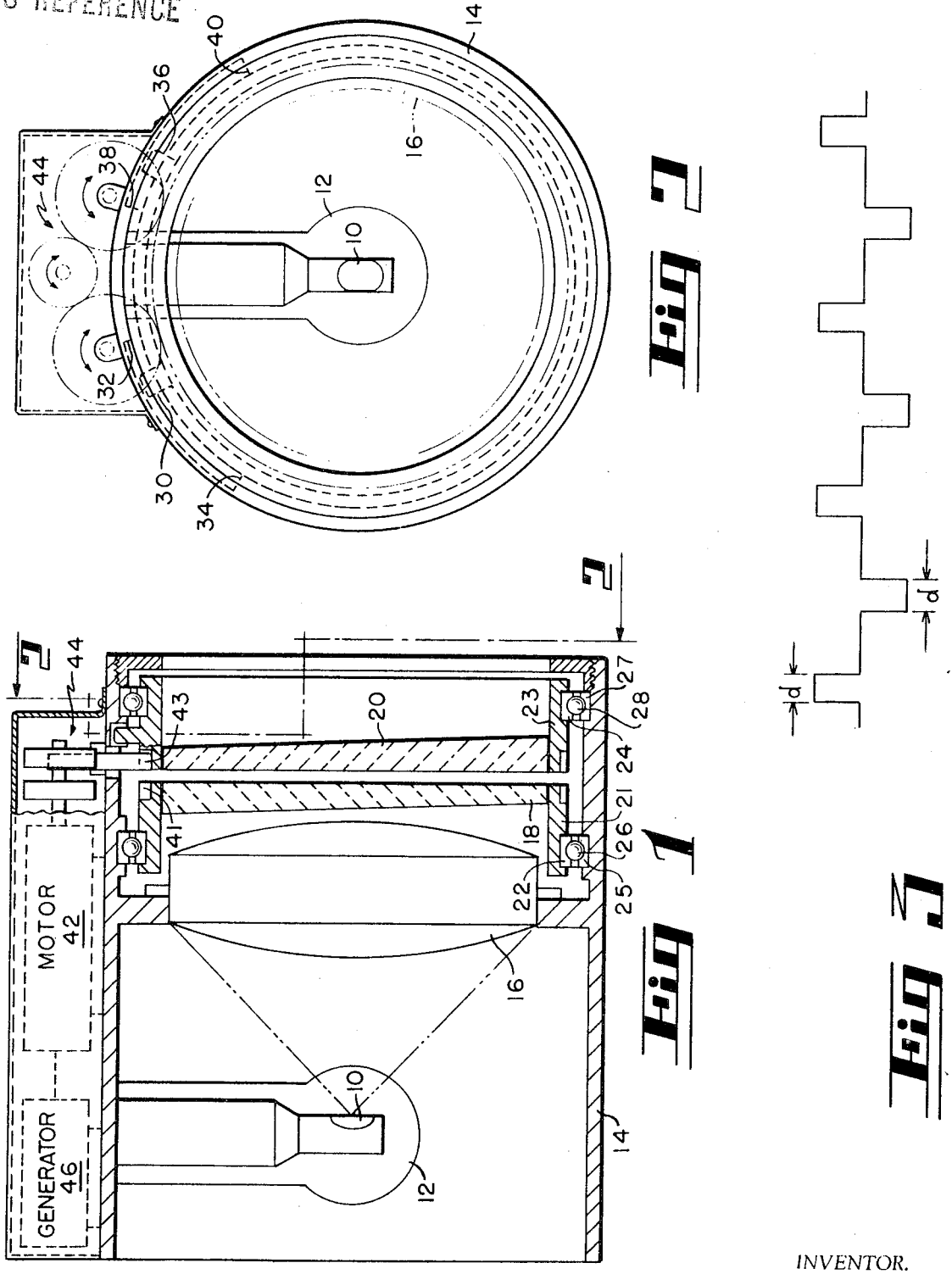
INVENTOR.
ANDREW T. IRELAND
BY Charles M. Hogan
Irwin P. Garfinkle
ATTORNEYS.

3,514,619
OPTICAL-MECHANICAL SCANNING APPARATUS UTILIZING OPPOSITELY OSCILLATING OPTICAL WEDGES
Andrew T. Ireland, Cincinnati, Ohio, assignor to Avco Corporation, Cincinnati, Ohio, a corporation of Delaware
Filed Nov. 30, 1967, Ser. No. 686,869
Int. Cl. G02b 17/00; G02f 1/16
U.S. Cl. 250—235    6 Claims

ABSTRACT OF THE DISCLOSURE

Infrared energy directed onto a detector is scanned by means of two oppositely oscillating optical wedges. The drive for the mechanism includes a reversible D.C. motor supplied with a square wave, the energy level of which may be varied.

BACKGROUND OF THE INVENTION

Rotating optical wedges are known in the prior art and are described in a publication entitled, "Handbook of Military Infrared Technology," endited by William L. Wolfe, published by the Office of Naval Research, in 1965. Various scanning techniques using one or more rotating wedges are described on page 735 of the publication. All of the described methods, as well as other known scanning methods, have inherent inaccuracies which the present invention seeks to overcome.

Scanning a detector, or line of detectors, across a field may be accomplished by rotating the whole equipment, or by means of a rotating mirror or prism. In other cases the primary lens is rotated around the detector.

Using a mirror or prism creates a bulky and slow scanning mechanism, and optical alignment and focus is difficult, bearing in mind that in some applications distances of a few inches plus or minus .001" to plus or minus .0005" must be maintained while the mirror is moved 15 to 30 cycles per second.

In accordance with the present invention two optical wedges are mounted in front of the primary lens (or mirror) and rotated back and forth with an oscillatory movement. Since the optical wedges are moved through a relatively small angle, approximately $\pi/6$ radians or 30°, a linear scan is maintained since for small angles the sine of the angle is approximately equal to the angle (measured in radians). At the same time the movement of the beam is relatively large. Tolerances are no longer extreme because a slight tipping of the optical wedges has only a secondary effect on the scan. The detectors are placed at a desired position relative to the primary lens and neither the lens nor the detector moves. Alignment is maintained since the position of the elements primarily determining this parameter do not move and there is no wear to cause dimension change.

DESCRIPTION OF THE DRAWINGS

FIG. 1 is a cross section of a representative embodiment of this invention;
FIG. 2 is an end view of FIG. 1; and
FIG. 3 is a curve showing the input to the D.C. motor for causing oscillatory motion.

DETAILED DESCRIPTION OF THE DISCLOSURE

Referring to FIG. 1, an infrared detector 10 is suitably mounted within a housing 12 and supported from the inside of a casing 14. The housing 12 forms no part of this invention but provides the necessary coolants for maintaining the highest efficiency of the detector 10. While not indicated in the drawings, the housing 12 is provided with a transparent portion to permit the transmission of infrared energy to the detector 10. Either a single detector element or a line of detector elements may be used; in either event, the object of the invention is to scan the detector 10 across a field of view.

Also mounted within the casing 14 is the system lens 16 which is fixedly mounted with respect to the detector 10, the detector 10 being positioned on the optical axis of the lens 16. While a lens is shown in the drawing, the system also contemplates the use of mirrors for focusing and directing the infrared energy onto the detector 10.

A pair of optical wedges 18 and 20 are rotatably mounted in front of the lens 16. The wedge 18 is secured within a ring 21, the outer periphery of which provides an inner race 22, while the wedge 20 is secured within a second ring 23, providing an inner race 24. The inner periphery of casing 14 provides the outer races 25 and 27 for the respective ball bearings 26 and 28. The ring 21 carries a projection 30 which runs between two stops 32 and 34 located adjacent the outer race 25 while the ring 23 carries a projection 36 which runs between stops 38 and 40 in the outer race. The rings 21 and 23 carry gear teeth 41 and 43, respectively. The wedges are oppositely oscillated by means of a motor 42 and gearing 44 which meshes with the gear teeth 41 and 43. The motor is energied by means of a generator 46. The motor 42 may be a D.C. motor or an A.C. motor so long as it is oscillated at an appropriate rate.

For a particular alternating current configuration the motor could be a two-phase alternating current motor, each phase of which is supplied with a different frequency. As described in U.S. Pat. No. 3,048,753 issued to Morin, this will cause an alternating current motor to oscillate at the difference frequency. Thus, for an alternating current two-phase motor 42 the generator 46 would supply each of the windings with a different frequency.

If the motor 42 is a D.C. motor, then it is alternately provided with positive and negative pulses, and preferably the generator 46 would supply square wave pulses of the type shown in FIG. 3. A D.C. motor may be preferred for the reason that it can be energized from a sample battery supply and because of the ease with which the energy supplied to the motor can be varied. Preferably the energy level can be varied by varying the frequency and the duration $d$ of each pulse. The generator 46 may be of any suitable configuration for either an A.C. or a D.C. motor so long as its energy level is adjustable to the particular system requirements.

THE OPERATION

In operation the energy level applied to the motor 42 is sufficient to start the wedges oscillating in one direction. It is noted, however, that with a D.C. motor the wedge will coast for a portion of the time until it strikes its respective stop and then reverses, whereupon a succeeding pulse will continue its rotation to the opposite stop and the cycle will repeat.

If an alternating current motor is used, the energy will be continuously applied sinusoidally to the wedges, and the frequency and energy level of the motor oscillation will be adjusted to meet the oscillating requirements of the two wedges 18 and 20.

With either arrangement the I.R. detector 10 will be provided with a linear sweep having a relatively uniform sensitivity throughout the entire sweep.

It is obvious that various modifications and adaptations will be available to persons skilled in the art. For example, the particular circuitry used for energizing the motor 42 or for mounting or housing the various elements are all within the skill of the art. Moreover, the energy supplied to a D.C. motor need not be in square wave form but may be commuted direct current or alternating polarity pulses of any shape.

What is claimed is:
1. In a system for scanning a field of light energy, the combination comprising:
   a light energy detector;
   an optical device for focusing light energy onto said detector;
   first and second optical wedges interposed between said field and said optical device; and
   means for oppositely oscillating said optical wedges through an angle, the size of said angle being defined as having a maximum limit equal to a number of radians, said number of radians being approximately equal to the sine of said angle, whereby said field of view of said detector is linearly scanned.
2. The invention as defined in claim 1 wherein said maximum number of radians is approximately $\pi/6$.
3. The invention as defined in claim 1 wherein said means for oscillating said wedges comprises a motor.
4. The invention as defined in claim 3 wherein said wedges are oppositely driven against stops positioned at said maximum angle; and means for periodically reversing the direction of energization of said motor.
5. The invention as defined in claim 4 wherein said motor is energized by a generator having an alternately positive and negative output, the energy level and frequency of said output being variable.
6. The invention as defined in claim 5 wherein said motor is a direct current motor and wherein said generator delivers alternately positive and negative square wave pulses having an adjustable frequency and an adjustable duty cycle.

References Cited

UNITED STATES PATENTS

| | | | |
|---|---|---|---|
| 2,870,671 | 1/1959 | Falconi | 250—236 X |
| 2,957,386 | 10/1960 | Robinson | 350—6 X |
| 3,083,611 | 4/1963 | Ziolkowski | 350—6 X |
| 3,226,721 | 12/1965 | Gould | 350—6 X |

JAMES W. LAWRENCE, Primary Examiner

E. R. LA ROCHE, Assistant Examiner

U.S. Cl. X.R.

350—6, 285

PO-1050
(5/69)

UNITED STATES PATENT OFFICE
CERTIFICATE OF CORRECTION

Patent No. 3,514,619            Dated May 26, 1970

Inventor(s)  Andrew T. Ireland

It is certified that error appears in the above-identified patent and that said Letters Patent are hereby corrected as shown below:

Column 1, line 24, "endited" for --- edited ---.

Column 2, lines 26 and 27, "energied" for --- energized ---.

Column 2, line 42, "sample" for --- simple ---.

Column 3, line 21, the period (.) should be changed to a semicolon (;) and add --- and means for periodically reversing the direction of energization of said motor. ---.

Column 4, line 1, change the semicolon (;) to a period (.) and delete the remainder of the sentence.

SIGNED AND
SEALED
OCT 27 1970

(SEAL)
Attest:

Edward M. Fletcher, Jr.
Attesting Officer

WILLIAM E. SCHUYLER, JR.
Commissioner of Patents